W. ROBINSON.
Electric Signalling Apparatus for Railroads.
No. 5,958. Reissued July 7, 1874.
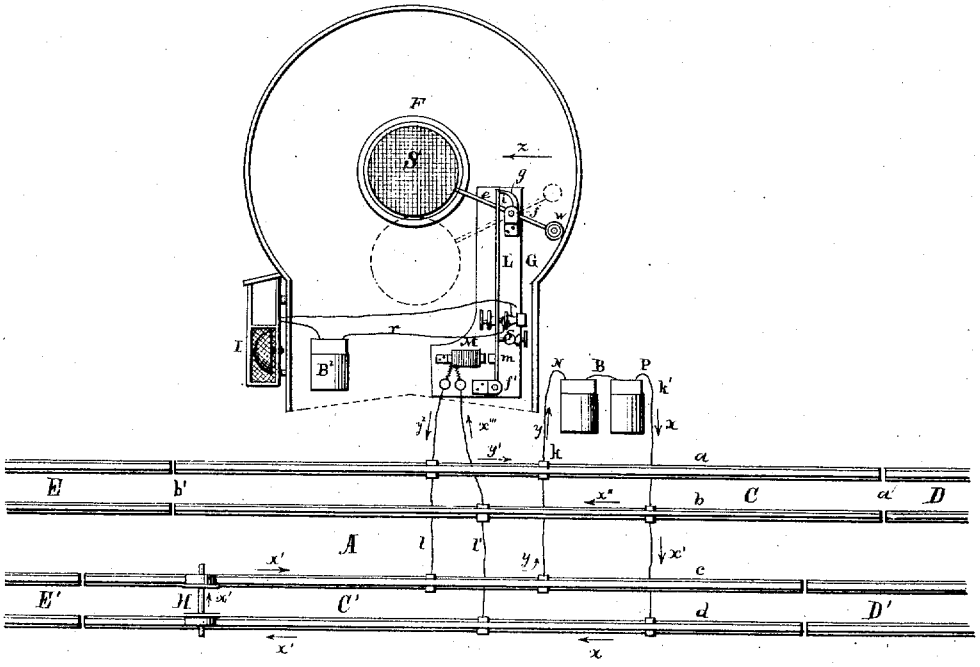
*Witnesses:*
James Robinson
Wm Forster
*Inventor:*
William Robinson

BEST AVAILABLE COPY

UNITED STATES PATENT OFFICE.

WILLIAM ROBINSON, OF BROOKLYN, NEW YORK.

IMPROVEMENT IN ELECTRIC SIGNALING APPARATUS FOR RAILROADS.

Specification forming part of Letters Patent No. 1 0,661, dated August 20, 1872; Reissue No. 5,958, dated July 7, 1874; application filed May 19, 1874.

*To all whom it may concern:*

Be it known that I, WILLIAM ROBINSON, of Brooklyn, in the county of Kings and State of New York, have invented a new and useful Electric Signaling Apparatus for Railways, of which the following is a full, clear, and exact description, reference being had to the accompanying drawing, forming part of this specification.

The figure represents a top view of a double-track railway with suitable sections and wire-connections, together with an elevation of the signal-box with its face removed to show the signal within, the whole being arranged to illustrate my invention.

The object of this invention is to operate electric signals, audible or visual, by means of moving or standing vehicles or trains, without the use of ordinary track-connections for closing or breaking circuits, and without the use or with a limited use of line-wires for conducting the electric current, the rails of the track being used for the latter purpose.

The invention consists, first, in a constant electric circuit for the purpose of operating electric railway-signals, audible or visual; second, in a visual or semaphoric electric signal, in combination with a constant metallic circuit composed in part of a rail or rails of the track; third, in an alarm or audible signal, in combination with a constant metallic circuit consisting in part of a rail or rails of the track; fourth, in an additional or secondary circuit, in combination with a primary circuit composed in part of a rail or rails of the track; fifth, in a visual and audible signal, in combination with each other and with a constant metallic circuit composed in part of a rail or rails of the track; sixth, in an electro-magnet and a battery so connected to the rails of a section of railroad-track that when connection is established between said rails by the wheels and axles of a car, or by other superior conductor, the electric circuit is partially changed and the signal operated through the demagnetization of the magnet; seventh, in an improved signal of very simple construction, whereby great ease of action is secured.

The invention also embraces certain peculiarities in the arrangement of wires from the signal and battery to the track.

A in the drawing represents a double-track railroad.

C is a section of track, which may be a mile long, more or less, and having its rails *a b* separated from metallic contact with the rails of the sections D and E, as shown at *a' b'*. In like manner the section C' of the other track has its rails separated from metallic contact with the rails of the sections D' and E'. The rails *a b c d* should each have metallic continuity throughout the length of its section.

The signal-box F is constructed of any suitable material, and is provided with an orifice, preferably in the center, covered with glass windows capable of illumination, through which the signal may be seen when exposed day or night. Within this signal-box is placed the signal G, consisting of a banner, S, attached to the lever *e*, which, pivoted at *f*, turns on a horizontal axis. To the lever *e* or its arbor is fixed the small projection or lever, preferably segmental, *g*. A cord, link, chain, or delicate elastic spring, *i*, is attached to the lever *g*, and to the upper part of the long lever L, in such a manner that when the armature *m*, which is attached to the lever L, is attracted by its magnet M, and the upper part of said lever L swings in the direction of the arrow *z*, the upper part of the segmental lever *g* moves forward and downward, thus permitting the chain *i* to work closer to the pivot *f*. By this arrangement it will be seen that the greatest leverage power is secured for moving the signal when the armature *m* is the greatest distance from its magnet and the magnetic force is consequently weakest, the leverage power diminishing gradually as the armature approaches the magnet. The vertical lever L moves on a horizontal axis, *f'*, and is prevented from swinging too far back from the magnet by the adjustable stop *s*, which may be so adjusted as to bring the armature *m* a greater or less distance from its magnet M, as may be found necessary. The levers L and *e* may be made of any suitable material and in any manner, but are preferably constructed of thin tubular metal for the purpose of securing great strength and rigidity with minimum weight and friction of parts. Furthermore, the banner S is counterbalanced by an adjustable weight, *w*, and by making that part of the lever *e* embraced between the pivot *f* and the banner S of considerable length the said banner is brought from a state of concealment to a state of exposure, or the reverse, by passing through a comparatively small angle, and by arranging the lever *e*, as shown in the drawing, in such a manner that in bringing the banner from a state of concealment to a state of exposure, or the reverse, said lever *e* shall swing to and beyond a horizontal position, the greatest uniformity of motion with the least possible loss of power is secured.

Having thus described the construction of the visual signal G, it will be seen that when the electro-magnet M is charged it attracts the armature *m* to itself, thus swinging the upper end of the lever L in the direction of the arrow *z* and carrying the upper end of the lever *g* forward, at the same time turning the same, together with the lever *e*, on the axis *f*, and carrying the banner S down into the position indicated in dotted outline. Now connect one pole of the battery B with the rails *a* and *c* and the other pole with the rails *b* and *d* of the sections C and C′ by means of the wires *k* and *k′*, respectively. In like manner connect the ends of the coils of the magnet M, the one end with the rails *a* and *c* and the other end with the rails *b* and *d* of the same sections C and C′, by the wires *l* and *l′*, as shown in the drawing, and the apparatus is operative. The wires from the battery and magnet are preferably insulated.

Before describing the operation of the apparatus as a whole, it may be stated that the electric current will follow a naked metallic conductor, if of sufficient surface, even when immersed in a river or in the mud at the bottom of a river, because the metal offers less resistance to its passage than either water or mud. Much more will it follow the rails of a railroad-track when they are made a part of the circuit, since the rails present a large surface of superior conducting material, which offers much less resistance to its passage than any surrounding mediums, and it is well known that when several courses are presented the electric current will follow that course which offers least resistance to its passage.

The mode of operation is as follows: Suppose the sections C and C′ to be entirely clear of cars. Then the electric current from the positive pole P of the battery B will pass, as indicated by the arrows *x x″*, through the wire *k′*, rail *b*, wire *l′*, and magnet M, magnetizing the same, and return through the wire *l*, rail *a*, and wire *k*, as indicated by the arrows *y′ y*, to the negative pole N of the battery. The magnet M, being thus magnetized, attracts its armature and swings the signal-banner S into the position of concealment, (shown in dotted outline,) and holds it in that position as long as the sections C C′ are clear. Now let a train enter upon C or C′, as indicated at H C′, and the wheels and axles of the same will bridge over and connect the rails *c* and *d*, and thus, by offering a large conducting surface, will present to the electric current a complete circuit, which offers much less resistance to its passage than the course through the magnet M. The electricity now takes the course over the wire *k′*, rail *d*, wheels and axle H, returning by the rail *c* and wire *k* to the battery, as indicated by the arrows *x x′ y*, using the rails *c* and *d*, as will be seen, with their bridge, and entirely avoiding the magnet M, which, being thus demagnetized, lets go its armature, and the counterpoise *w*, or its equivalent, which slightly overbalances the banner S, carries the same up in front of the orifice into a position of exposure, where it remains, as shown, while a train or car is on section C or C′. When, however, the train has run off the section, leaving C and C′ clear, the magnet M is instantly magnetized again and the signal-banner S is removed and kept concealed until the track is again blocked by the presence of another train, when the same process is repeated. When the signal-banner is in a position of exposure, as shown, the lever L may serve to close an additional circuit through the battery B′, which may be used to operate an alarm, I, in conjunction with the signal S, or to actuate another signal at any distant point. Furthermore, the concealment of the signal S may serve to close another circuit for exposing an additional signal, or the reverse.

Instead of using the signal G constructed as herein minutely described, a signal of any suitable construction may be used without affecting the spirit of the invention. Furthermore, instead of using the magnet M to actuate the signal directly, it may be used as a relay, operating, when magnetized, to keep the circuit which directly actuates the signal open or closed, as desired.

It is evident that an alarm may be used either in conjunction with or independently of a visual signal.

The drawing shows an application particularly adapted to road-crossing signaling on a double track. The signals may be used also on a single track and be applied as block-signals, and for other purposes on single or double tracks. When used as a block-signal or for other purposes, it may be desirable to indicate at a distant station when the signal is operative. To accomplish this object, carry one of the wires from the magnet M to the distant station. Here let the wire be passed through the coils of a bell-magnet or other signaling device, and thence be carried to the track and attached to the same, as already described. The distant office or station signal will operate simultaneously with the signal S. Thus any desired number of signals may be operated simultaneously at different points from a single section of track.

By a slight modification of the plan described an efficient switch and draw-bridge signal may be operated, the rails being used as conductors. Thus, half a mile (more or less) from a switch may be placed a signal-box and signal, substantially as described, and connected with the rails, as shown. Near this point let the rails be divided, taking care that the signal and battery wires are connected to the section toward the switch. Now, while the switch is on the main line, the bars connecting the rails of the switch will act as a bridge to divert the electricity from the signal-magnet; but when the switch is misplaced the metallic connection of the rails of the track will be interrupted. The signal-magnet will thus become charged and the position of the signal changed. In this case the signal should be exposed when the magnet M is charged. In like manner a cross-bar may bridge the rails on a draw-bridge. The displacing of the draw-bridge or withdrawing of the bolt or bolts which hold the same in position will allow the signal-magnet to become charged and the signal to be changed, substantially as described, in connection with a switch.

It is not necessary in all cases that the rails *a* and *b*, section C, should both be separated from metallic contact with the sections D and E. It may often, if not always, be sufficient to separate only one of said rails from such metallic contact with the adjacent sections.

A constant circuit for railway signaling purposes is a chief feature of this invention, and while I have herein clearly described perhaps the best method of using such a circuit, nevertheless I do not limit myself to this specific method, but contemplate the use of a constant circuit as such for electric signaling purposes, whether such circuit includes the rails of a railroad-track or otherwise. By a "constant circuit" is understood a circuit whose magnet or magnets are operated or controlled without actually opening the circuit through said magnet or magnets.

What I here claim as new, and desire to secure by Letters Patent, is—

1. The combination, of a constant circuit, a magnet or magnets operated or controlled without actually opening the circuit of said magnets, and an electric railway signal or signals, substantially as described.

2. A visual or semaphoric signal, in combination with a constant circuit composed in part of a rail or rails of a railroad-track, substantially as set forth.

3. An alarm or audible signal, in combination with a constant circuit composed in part of a rail or rails of the track, essentially as described.

4. An additional or secondary circuit, in combination with a primary circuit composed in part of a rail or rails of the track, essentially as and for the purpose described.

5. A visual and an audible signal, in combination with each other and with a constant circuit composed in part of a rail or rails of the track, substantially as described.

6. The battery B and magnet M, so connected to the rails of a section of railroad-track that when connection is established between the rails of said section by the wheels and axle of a car, or by other superior conductor the electric circuit is partially changed and the signal operated through the demagnetization of the magnet M, substantially as specified.

7. A signal constructed partially of tubular material, for the purpose of securing lightness combined with strength, in the manner substantially as herein set forth.

8. The arrangement of the pivotal bearing of the lever *e* at a point midway between the horizontal lines of exposure and concealment of the signal-banner, as shown and described, for the purpose set forth.

9. The combination of the elastic spring *i*, or its equivalent, with the levers L and *e* and signal-banners S, substantially as set forth.

10. The battery B, in combination with the wires *k k'*, rails *a b* of a railroad-track, wires *l l'*, and magnet M, substantially as and for the purpose herein described.

11. The additional or secondary circuit *r*, in combination with the magnet M, wires *l l'* *k k'*, battery B, and section of rails of a railroad-track, essentially as described.

12. A railway signal or series of signals, in combination with a constant circuit, as described, charged in its normal condition, essentially as indicated.

WILLIAM ROBINSON.

Witnesses:

JAMES ROBINSON.

WM. FORSTER.